US012546753B2

(12) United States Patent
Cox et al.

(10) Patent No.: US 12,546,753 B2
(45) Date of Patent: Feb. 10, 2026

(54) NON-CONTACT SAMPLER WITH AN OPEN-PORT INTERFACE FOR LIQUID CHROMATOGRAPHY SYSTEMS

(71) Applicant: DH Technologies Development Pte. Ltd., Singapore (SG)

(72) Inventors: David Michael Cox, Toronto (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 337 days.

(21) Appl. No.: 18/550,001

(22) PCT Filed: Mar. 18, 2022

(86) PCT No.: PCT/IB2022/052502
§ 371 (c)(1),
(2) Date: Sep. 11, 2023

(87) PCT Pub. No.: WO2022/195559
PCT Pub. Date: Sep. 22, 2022

(65) Prior Publication Data
US 2024/0159716 A1    May 16, 2024

Related U.S. Application Data

(60) Provisional application No. 63/163,197, filed on Mar. 19, 2021.

(51) Int. Cl.
*G01N 30/20* (2006.01)
*B01D 15/14* (2006.01)
(Continued)

(52) U.S. Cl.
CPC ............. *G01N 30/20* (2013.01); *B01D 15/14* (2013.01); *G01N 30/22* (2013.01); *G01N 30/7233* (2013.01); *G01N 2030/201* (2013.01)

(58) Field of Classification Search
CPC .... G01N 30/20; G01N 30/22; G01N 30/7233; G01N 2030/201
(Continued)

(56) References Cited

U.S. PATENT DOCUMENTS 5,109,840 A    5/1992 Daleiden
5,691,205 A    11/1997 Kawabata et al.
(Continued)

FOREIGN PATENT DOCUMENTS

EP    0421007    4/1991
EP    2443432    4/2012
(Continued)

OTHER PUBLICATIONS

Anonymous, "Turbo V Ion Source Operator Guide", AB Sciex Pte, Ltd., Aug. 1, 2015, retrieved from the internet on Mar. 17, 2022 at: https://manualzz.com/doc/7476753/user-guide--turbo-v-ion-source-operator-guide, "TurboIonSpray Probe Optimization", and "Adjust the Electrode Tip Extension", 52 pages.
(Continued)

*Primary Examiner* — Peter J Macchiarolo
*Assistant Examiner* — Rodney T Frank
(74) *Attorney, Agent, or Firm* — Merchant & Gould P.C.

(57) ABSTRACT

A method of performing liquid chromatography (LC) with an LC system including an LC column and an analyzer includes delivering a transport liquid to an open port interface (OPI) of a sample receiving circuit, wherein the sample receiving circuit includes a sample transfer chamber. A sample is ejected from a sample holder into the OPI with a non-contact ejector. The transport liquid and the sample are received in the sample transfer chamber. The sample transfer chamber is decoupled from the sample receiving circuit. A solvent is delivered to the analysis circuit. The sample is pushed from the sample transfer chamber with the solvent.
(Continued)

The sample and the solvent is passed through the LC column to produce an eluent. The eluent is analyzed with the analyzer.

20 Claims, 15 Drawing Sheets

(51) Int. Cl.
   *G01N 30/22* (2006.01)
   *G01N 30/72* (2006.01)
(58) Field of Classification Search
   USPC .......................................................... 73/61.55
   See application file for complete search history.

(56) References Cited

U.S. PATENT DOCUMENTS

| | | | |
|---|---|---|---|
| 7,923,681 | B2 | 4/2011 | Collings et al. |
| 8,759,753 | B1 * | 6/2014 | Di Bussolo .......... B01D 15/325 |
| | | | 73/1.02 |
| 9,134,335 | B2 * | 9/2015 | Dehmer ................. B01L 3/021 |
| 10,770,277 | B2 | 9/2020 | Datwani et al. |
| 11,232,938 | B2 | 1/2022 | Arnold et al. |
| 2003/0193020 | A1 | 10/2003 | Van Berkel |
| 2004/0102742 | A1 | 5/2004 | Tuyl |
| 2013/0092166 | A1 | 4/2013 | Pearce |
| 2013/0118498 | A1 | 5/2013 | Robitaille et al. |
| 2013/0294971 | A1 | 11/2013 | Van Berkel et al. |
| 2014/0216177 | A1 | 8/2014 | Van Berkel et al. |
| 2014/0283627 | A1 | 9/2014 | Hattingh et al. |
| 2016/0266017 | A1 | 9/2016 | Kennedy et al. |
| 2017/0316926 | A1 | 11/2017 | Arnold et al. |
| 2018/0021533 | A1 | 1/2018 | Gausche-Hill et al. |
| 2019/0072464 | A1 * | 3/2019 | Wiederin ................ G01N 30/06 |
| 2019/0157061 | A1 | 5/2019 | Datwani et al. |
| 2020/0043712 | A1 * | 2/2020 | Arnold ................ H01J 49/0495 |
| 2020/0345968 | A1 | 11/2020 | Merrell et al. |
| 2020/0365382 | A1 | 11/2020 | Arnold et al. |
| 2021/0121905 | A1 | 4/2021 | Covey |
| 2021/0190735 | A1 * | 6/2021 | Bonda ..................... G01N 30/24 |
| 2023/0349858 | A1 | 11/2023 | Covey |
| 2024/0079225 | A1 | 3/2024 | Covey |
| 2024/0096611 | A1 | 3/2024 | Covey |
| 2024/0112901 | A1 | 4/2024 | Liu |
| 2024/0170270 | A1 | 5/2024 | Kovarik |
| 2024/0170271 | A1 | 5/2024 | Kovarik |
| 2024/0175787 | A1 | 5/2024 | Tate |
| 2024/0272191 | A1 | 8/2024 | Verma |

FOREIGN PATENT DOCUMENTS

| | | |
|---|---|---|
| WO | 2010/048339 | 12/2010 |
| WO | 2011/146269 | 11/2011 |
| WO | 2012/149314 | 11/2012 |
| WO | 2013/112914 | 8/2013 |
| WO | 2014/140776 | 9/2014 |
| WO | 2015/108807 | 7/2015 |
| WO | 2015/188282 | 12/2015 |
| WO | 2018/217778 | 11/2018 |
| WO | 2019/102350 | 5/2019 |
| WO | 2019/126363 | 6/2019 |
| WO | 2020/016809 | 1/2020 |
| WO | 2020/079647 | 4/2020 |
| WO | 2021/234644 | 11/2021 |
| WO | 2022/172199 | 8/2022 |
| WO | 2022/201037 | 9/2022 |
| WO | 2022/208393 | 10/2022 |

OTHER PUBLICATIONS

Bonvin, Gregoire et al., "Capillary electrophoresis; electrospray ionization-mass spectrometry interfaces: Fundamental concepts and technical developments", Journal of Chromatopgraphy A, vol. 1267, Dec. 1, 2012, pp. 17-31.

Dirico, Kenneth et al., "Ultra-High-Throughput Acoustic Droplet Ejection-Open Port Interface-Mass Spectrometry for Parallel Medicinal Chemistry", ACS Medicinal Chemistry Letters, vol. 11, No. 6, May 1, 2020, pp. 1101-1110.

Hager, James et al., "Product ion scanning using Q-q-Q linear ion trap (Q TRAP) mass spectrometer", Rapid Communications in Mass Spectrometry, 2003; 17: 1056-1064.

Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.

Maxwell, E. Jane et al., "Decoupling CE and ESI for a more robust interface with MS", Electrophoresis, Verlag-Chemie, Hoboken, USA, vol. 31, No. 7, Mar. 1, 2010, pp. 1130-1137.

PCT International Preliminary Report on Patentability in Application PCT/IB2022/052502, mailed Sep. 28, 2023, 8 pages.

PCT International Search Report and Written Opinion in Application PCT/IB2022/052502, mailed Jul. 12, 2022, 16 pages.

Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.

Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.

Sciex, Echo MS Core Module User Guide, published by Sciex, RUO-IDV-05-9945-C, Apr. 2020, 51 pages.

Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.

Tascon, Marcos et al., "Development of a microfluidic open interface with flow isolated desorption volume for the direct coupling of SPME devices to mass spectrometry", Analytical Chemistry, vol. 90, No. 4, Feb. 1, 2018, pp. 2631-2638.

Van Berkel et al., Immediate drop on demand technology (I-DOT) coupled with mass spectrometry via an open-port sampling interface, Bioanalysis, vol. 9, No. 21, Nov. 2, 2017, pp. 1667-1679.

Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.

Van Berkel, Gary et al., "Combined Falling Drop/Open Port Sampling Interface System for Automated Flow Injection Mass Spectrometry", Analytic Chemistry, 2017, 89, 22, pp. 12578-12586.

Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.

Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.

Zhang, Hui et al., "Acoustic Ejection Mass Spectrometry for High-Throughput Analysis", Analytical Chemistry, Jan. 29, 2020, 12 pages.

* cited by examiner

NON-CONTACT SAMPLER WITH AN OPEN-PORT INTERFACE FOR LIQUID CHROMATOGRAPHY SYSTEMS

CROSS-REFERENCE TO RELATED APPLICATION

This application is a National Stage Application of PCT/IB2022/052502, filed on Mar. 18, 2022, which claims the benefit of U.S. Provisional Patent Application No. 63/163,197, filed on Mar. 19, 2021, the entire disclosures of which are incorporated herein by reference in their entireties. To the extent appropriate, a claim of priority is made to each of the above disclosed applications.

BACKGROUND

Mass spectrometry (MS) based methods can achieve label-free, universal mass detection of a wide range of analytes with exceptional sensitivity, selectivity, and specificity. As a result, there is significant interest in improving the throughput of MS-based analysis for many applications.

SUMMARY

In one aspect, the technology relates to a method of performing liquid chromatography (LC) with an LC system including an LC column and an analyzer, the method including: delivering a transport liquid to an open port interface (OPI) of a sample receiving circuit, wherein the sample receiving circuit includes a sample transfer chamber; ejecting a sample from a sample holder into the OPI with a non-contact ejector; receiving the transport liquid and the sample in the sample transfer chamber; decoupling the sample transfer chamber from the sample receiving circuit; coupling the sample transfer chamber to an analysis circuit; delivering a solvent to the analysis circuit; pushing the sample from the sample transfer chamber with the solvent; passing the sample and the solvent through the LC column to produce an eluent; and analyzing the eluent with the analyzer. In an example, the sample is ejected into the OPI substantially simultaneously with delivering the transport liquid to the OPI. In another example, the method further includes aspirating a portion of the transport liquid from the sample transfer chamber substantially simultaneously with delivering the transport liquid to the OPI. In yet another example, the method further includes ejecting from a waste outlet the portion of the transport liquid aspirated from the sample transfer chamber. In still another example, delivering the transport liquid to the OPI includes pumping the transport liquid to the OPI at a first flow rate with a first pump.

In another example of the above aspect, aspirating the portion of the transport liquid from the sample transfer chamber includes aspirating the portion of the transport liquid at a second flow rate with a second pump. In an example, the first flow rate and the second flow rate are substantially similar. In another example, the method further includes, prior to decoupling the sample transfer chamber from the sample receiving circuit, terminating delivery of the transport liquid to the OPI and terminating ejection of the sample from the sample holder. In yet another example, the method further includes, prior to decoupling the sample transfer chamber from the sample receiving circuit, receiving a plurality of samples in the sample transfer chamber. In still another example, the method further includes during pushing of the sample, flushing the sample receiving circuit with a flushing liquid.

In another example of the above aspect, the transport liquid is substantially similar to the flushing liquid. In an example, flushing the sample receiving circuit includes operating a transport liquid pump and a waste pump. In another example, the method further includes, subsequent to pushing of the sample, recoupling the sample transfer chamber to the sample receiving circuit. In yet another example, the transport liquid and the solvent are different.

In another aspect, the technology relates to A liquid chromatography (LC) system including: an analysis circuit including a solvent pump and an LC column; an analyzer fluidically coupled to the LC column; a sample receiving circuit including a transport liquid pump and an open port interface (OPI) fluidically coupled to the transport liquid pump; a non-contact ejector configured to eject droplets from a sample holder into the OPI; and a sample transfer chamber selectively positionable in a first position and a second position, wherein in the first position, the sample transfer chamber is fluidically coupled to the sample receiving circuit, and wherein in the second position, the sample transfer chamber is fluidically coupled to the analysis circuit. In an example, the sample receiving circuit further includes a waste pump selectively fluidically couplable to the sample transfer chamber. In another example, the transport liquid pump is the waste pump. In yet another example, the sample transfer chamber is disposed within a six-port valve. In still another example, the analyzer includes a mass spectrometry device.

In another example of the above aspect, the non-contact ejector includes an acoustic droplet ejector.

DETAILED DESCRIPTION

HPLC separates analytes within a sample based on their different interaction with adsorbent material. In standard HPLC systems, a liquid sample is dissolved in a solvent (e.g., the mobile phase), and then flowed through a device (e.g., a liquid chromatography (LC) column) containing a stationary phase. The analytes with stronger retention to the stationary phase will take longer to travel through the LC column, thus causing separation of the sample. The target analytes of the separated sample may then be delivered to a detector for analysis, as described herein. Pressure from the HPLC system may be used to initiate a controlled flow of an eluent of the separated sample and the solvent through the LC column and towards the detector. HPLC systems can utilize different buffers or solvents, including those that have high conductivity.

Figure 1:
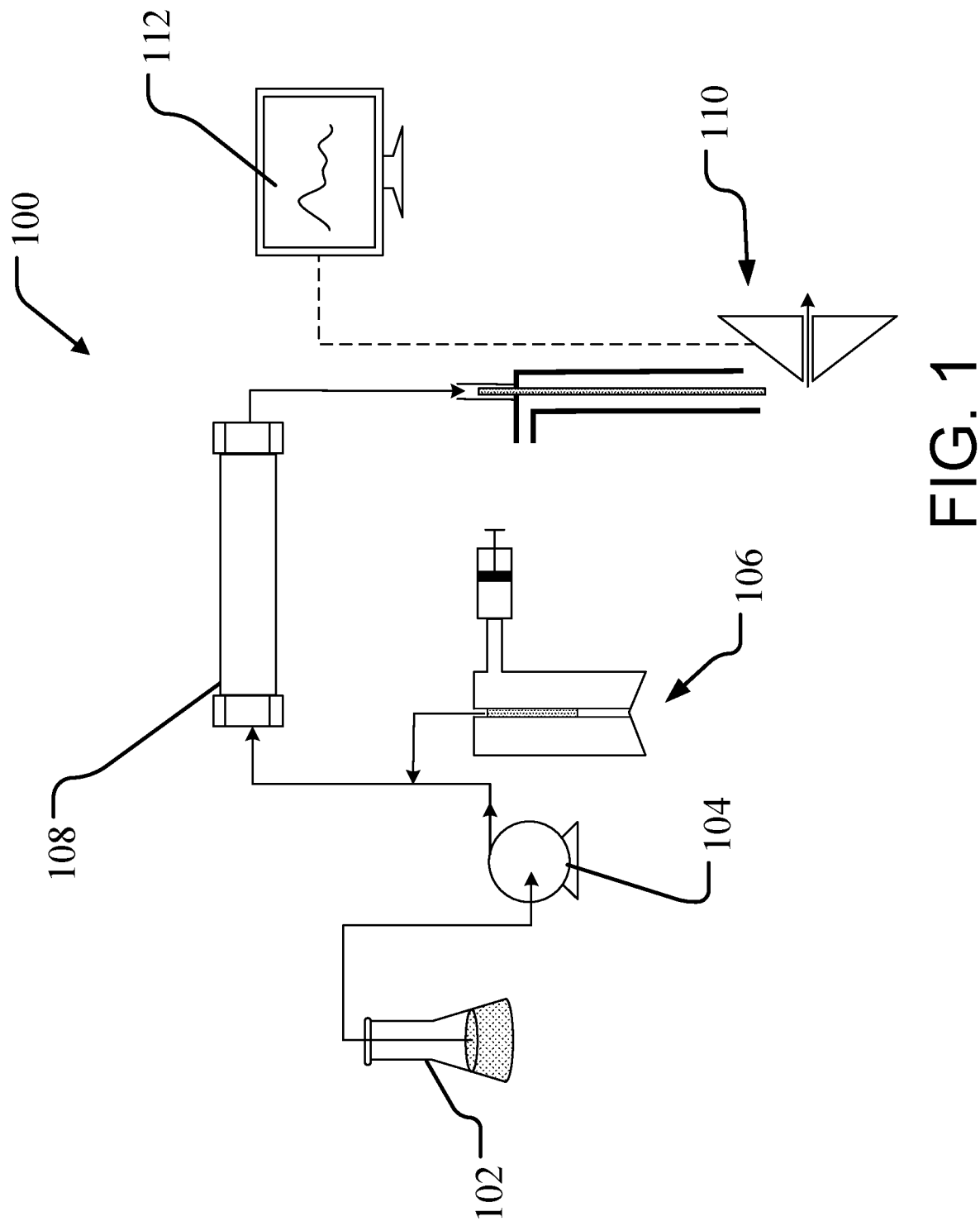
FIG. 1 depicts a schematic view of a high-performance liquid chromatography (HPLC) system.

FIG. 1 is a schematic depiction of an HPLC system 100. The components of such systems are very well known in the art, but are described here to provide further context to the disclosure. The HPLC system 100 includes one or more solvent reservoirs 102 that contain solvent(s) to be used as a moving fluid stream (the so-called "mobile phase"). A variety of solvents that may be utilized and are well-known in the art. The solvent(s) are drawn from the one or more reservoirs 102 by a solvent delivery system in the form of a high-pressure liquid chromatography pump 104. Samples are then delivered to the mobile phase at an autosampler 106, which injects the samples into the solvent. Relevant to the present application, an open port interface (OPI), in conjunction with a non-contact ejection system, may be utilized as the autosampler 106. Both the OPI and details regarding incorporation thereof into various HPLC systems are described below. Discrete samples are then carried by the mobile phase to the head of a chromatographic column 108. The mobile phase and injected samples enter the column 108 and pass through a particle bed therein. The particle bed separates the sample into individual analyte bands. The separated mixture passes to a detector 110, which may be a mass analysis device such as a mass spectrometry (MS) detector, or other type of detector, as described herein. A controller in the form of a computer 112 may be used to process, analyze, display, etc., the results received from the detector 110, as well as control the various other components within the HPLC system 100. Thus, sample compounds that include multiple analytes that otherwise could not be distinguished from one another by standard MS systems may have those analytes first separated in an LC column, prior to introduction, analysis, and identification in the MS system.

The HPLC systems described herein utilize an OPI in conjunction with a non-contact sampling device, as the autosampler (depicted in FIG. 2 as element 206) to introduce samples to an HPLC system. In examples, the non-contact sampling device may be an acoustic droplet ejector (ADE) or a pressure-based ejector, or a pressure-based droplet dispenser. Use of a non-contact sampling device in conjunction with an OPI has a number of advantages. For example, such systems typically allow for rapid ejection of samples from a well plate or other sample holder. Cross-contamination between individual wells or sample holders can also be reduced or eliminated by eliminating the physical structure, such as a pipette, used to draw samples from individual wells. Since such pipettes must be cleaned between wells, elimination of such physical elements can drastically increase system throughput and reduce solvent waste. Further, with the configurations depicted herein, only select samples contained in a well plate need be subject to a complete LC analysis, which also reduces total time typically required to analyze all the samples of a well plate.

Figure 2:
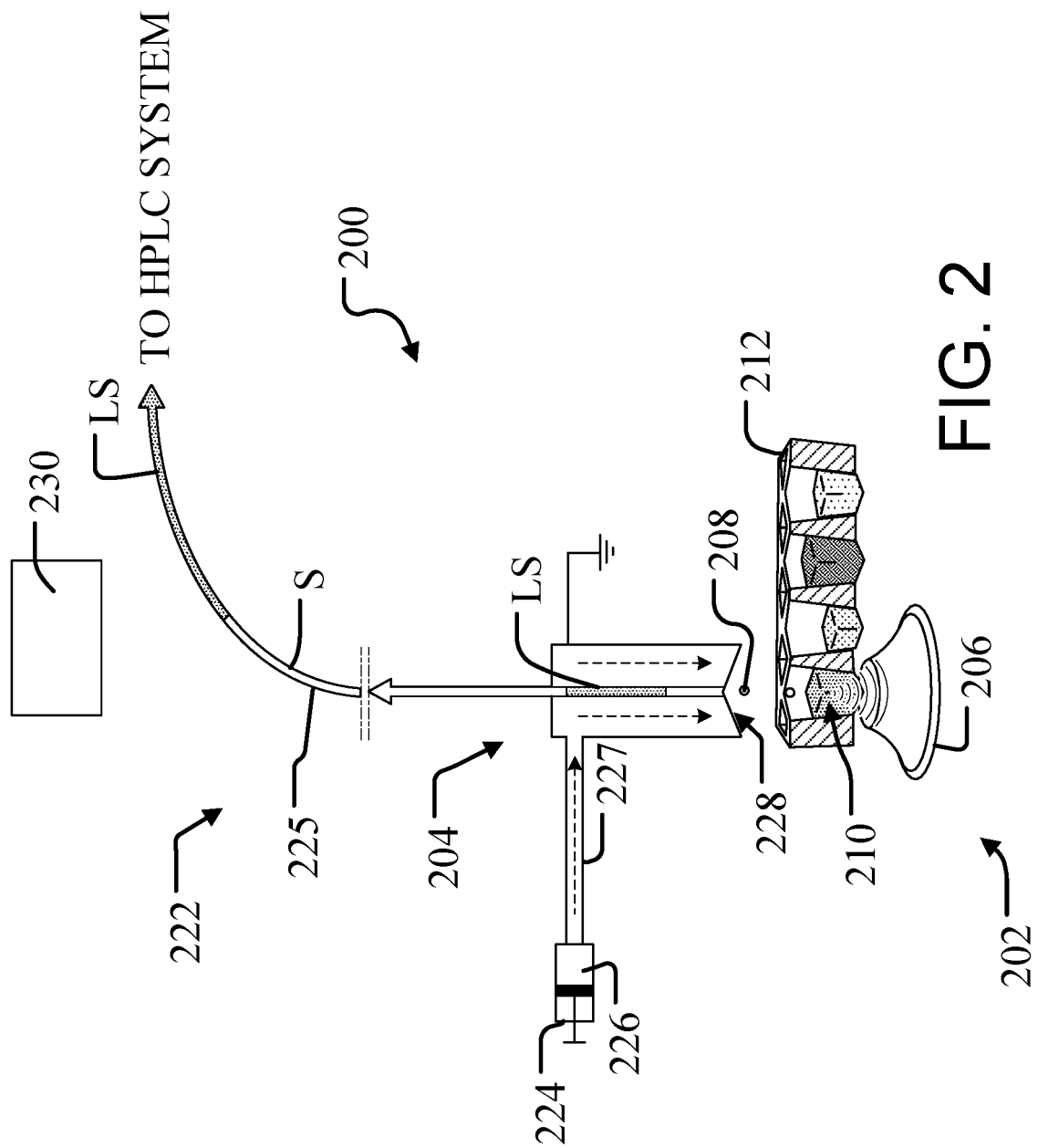
FIG. 2 depicts a schematic view of an example system combining a non-contact sampling device with an open port interface (OPI) sampling interface.

FIG. 2 depicts a schematic view of such an autosampler 200, including both a non-contact sampling device 202 and an OPI sampling interface 204. In examples, the non-contact sampling device 202 may be an ADE or a pressure-based droplet ejector, as described elsewhere herein. The ADE 202 includes an acoustic ejector 206 that is configured to eject a droplet 208 from a reservoir or well 210 of a well plate 212 into the open end of sampling OPI 204. A liquid handling system 222 (e.g., including one or more pumps 224) provides for the flow of liquid from a transport liquid reservoir 226. The transport liquid may be aspirated out of the OPI 204, along with a liquid sample, as described elsewhere herein. The transport liquid reservoir 226 (e.g., containing a liquid desorption solvent) can be fluidically coupled to the sampling OPI 204 via a supply conduit 227 through which the transport liquid can be delivered at a selected volumetric rate by the pump 224 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 204 occurs within a sample space accessible at the open end such that one or more droplets 208 can be introduced into the transport liquid boundary 228.

The ADE 202 is configured to generate acoustic energy that is applied to a liquid contained within a reservoir 210 that causes one or more droplets 208 to be ejected from the reservoir 210 into the open end of the sampling OPI 204. A controller 230 can be operatively coupled to and can be configured to operate any aspect of the autosampler 200. Controller 230 can be, but is not limited to, a microcontroller, a computer, a microprocessor, or any device capable of sending and receiving control signals and data. In examples, the controller 230 may be the controller of the HPLC system depicted in FIG. 1. Wired or wireless connections between the controller 230 and the remaining elements of the autosampler 200 are not depicted but would be apparent to a person of skill in the art.

The liquid discharged may include discrete volumes of liquid samples LS received from each reservoir 210 of the well plate 212. The discrete volumes of liquid samples LS are typically separated from each other by volumes of the transport liquid S as they are aspirated through a conduit 225. In conjunction with the HPLC system depicted generally in FIG. 1, devices for aspirating the sample and transport liquid are described in more detail below.

Figure 3:
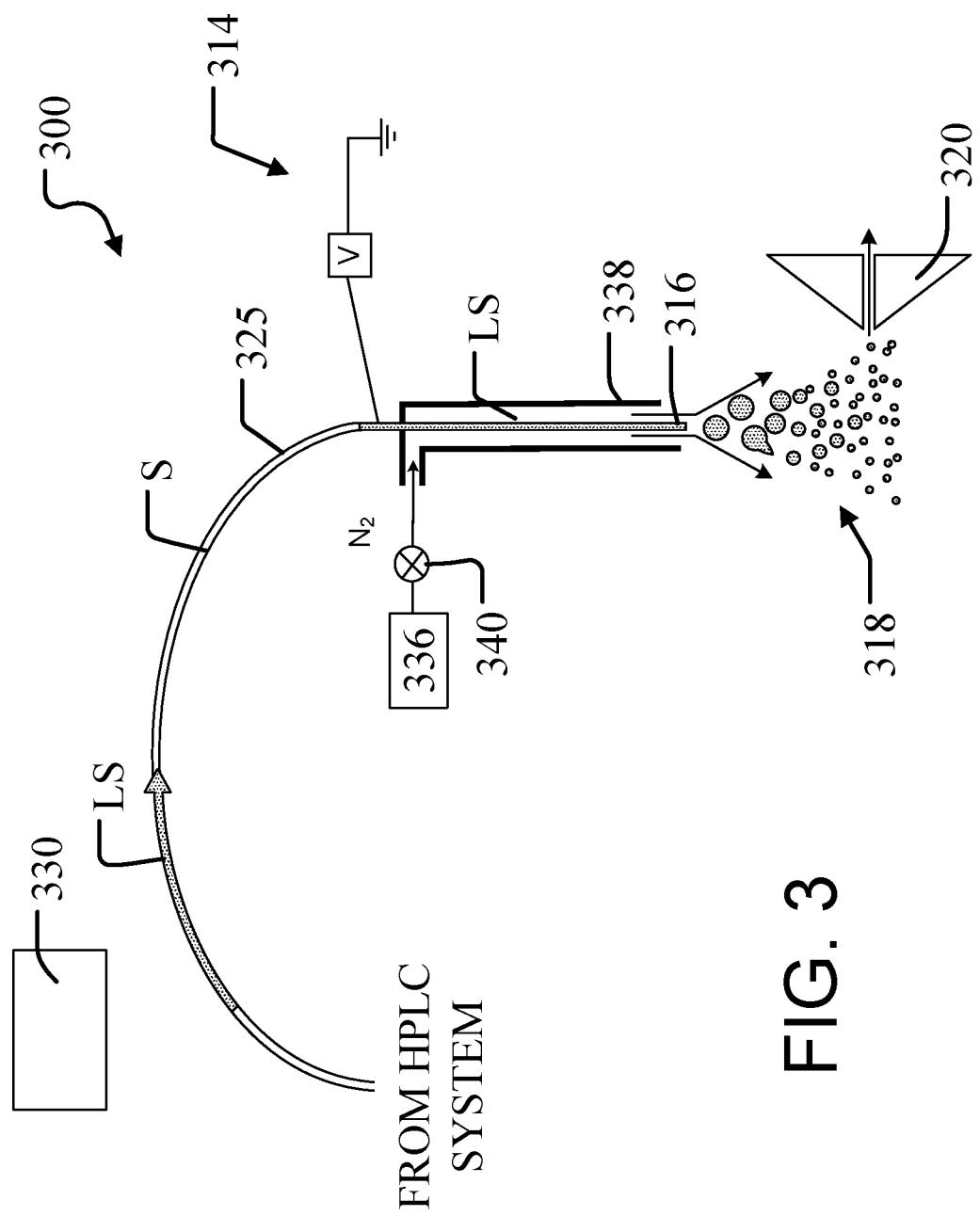
FIG. 3 depicts a schematic view of an example system combining a mass analysis device with an electrospray ionization (ESI) source.

FIG. 3 depicts a mass analysis system 300 such as a mass spectrometry (MS) system that is for ionizing and mass analyzing analytes received from the HPLC system. Such a system 300 is described, for example, in U.S. Pat. No. 10,770,277, the disclosure of which is incorporated by reference herein in its entirety. As shown in FIG. 3, the example MS 300 generally includes the an ESI source 314 for discharging a liquid containing one or more sample analytes (e.g., via electrospray electrode 316) into an ionization chamber 318, and a mass analyzer detector (depicted generally at 320) in communication with the ionization chamber 318 for downstream processing and/or detection of ions generated by the ESI source 314. Due to the configuration of the nebulizer probe 338 and electrospray electrode 316 of the ESI source 314, samples ejected therefrom are transformed into the gas phase. The ESI source 314 can include a source 336 of pressurized gas (e.g. nitrogen, air, or a noble gas) that supplies a high velocity nebulizing gas flow to the nebulizer probe 338 that surrounds the outlet end of the electrospray electrode 316. As depicted, the electrospray electrode 316 protrudes from a distal end of the nebulizer probe 338. The nebulizing gas flow interacts with the liquid discharged from the electrospray electrode 316 to enhance the formation of the sample plume and the ion release within the plume for sampling by mass analyzer detector 320, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 330 (e.g., via opening and/or closing valve 340). In examples, a controller 330 may be the controller of the HPLC system depicted in FIG. 1.

It will also be appreciated by a person skilled in the art and in light of the teachings herein that the mass analyzer detector 320 can have a variety of configurations. Generally, the mass analyzer detector 320 is configured to process (e.g., filter, sort, dissociate, detect, etc.) sample ions generated by the ESI source 314. By way of non-limiting example, the mass analyzer detector 320 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 37: 3056-1064); and U.S. Pat. No. 7,923,681, entitled "Collision Cell for Mass Spectrometer," the disclosures of which are hereby incorporated by reference herein in their entireties. Other detectors, such as UV-vis absorbance detectors, charged aerosol detectors (CAD), refractive index detectors, photodiode array detectors (PDA), inductively-coupled plasma mass spectrometry detectors, (ICP-MS), or fluorescence detectors, may also be utilized.

Other detectors, including but not limited to those described herein and others known to those skilled in the art, can also be utilized in conjunction with the HPLC systems described herein. For instance, other suitable systems that may be utilized in conjunction with the HPLC systems described herein include single quadrupole, triple quadrupole, ToF, trap, and hybrid analyzers. It will further be appreciated that any number of additional elements can be included in the system 300 including, for example, an ion mobility spectrometer (e.g., a differential mobility spectrometer (DMS)) that is disposed between the ionization chamber 318 and the mass analyzer detector 320 and is configured to separate ions based on their mobility difference under high-field and low-field conditions. Additionally, it will be appreciated that the mass analyzer detector 320 can comprise a detector that can detect the ions that pass through the analyzer detector 320 and can, for example, supply a signal indicative of the number of ions per second that are detected.

The subsystems depicted above in FIGS. 1-3 can be combined in various configurations to produce HPLC systems that benefit from non-contact ejection, high throughput analysis, and other performance advantages that will be apparent to a person of skill in the art upon reading the following disclosure. The described subsystems may be integrated into a single HPLC system in accordance with the examples depicted herein, and other configurations. Such systems may utilize a plurality of individually-controlled valves, pumps, moveable well plate stages, OPIs, ADEs, etc., to move samples though various configurations of liquid flow paths. The flow paths may be full-scale or may be on a microfluidic scale.

FIGS. 4A-4D depict an HPLC system 400 utilizing a non-contact sampling device 402 and an OPI sampling interface 404. The components depicted in FIGS. 4A-4D are described concurrently, followed by a description of the operation of the HPLC system 400. The non-contact sampling device 402 ejects a sample droplet 406 from a well tray 408. A low-pressure transport liquid pump 410 delivers transport liquid to the OPI 404, as described elsewhere herein. A low-pressure waste pump or aspirator 412 provides the aspiration pressure to draw the transport liquid and sample droplet 406 through the sample receiving circuit 414 of the system 400. The transport liquid and sample droplet 406 are drawn through a valve 426 (described below) and ultimately ejected to a waste container 416. An LC analysis circuit 418 of the system 400 includes a high-pressure solvent pump 420 (also referred to as an HPLC pump) that delivers solvent through the valve 426 and onward through the LC column 422 and to a detector 424. The valve 426 selectively connects parts thereof to the sample receiving circuit 414 or the LC analysis circuit 418. The valve 426 includes a sample transfer chamber 428 and a bypass channel 430, as well as a number of ports, identified in FIGS. 4A-4D as ports 1-4. These may be selectively coupled to connections on the sample receiving circuit 414 (connections A and B) and connections on the analysis circuit 418 (connections C and D). A first method of operation of the system 400 will now be described.

Figure 4A:
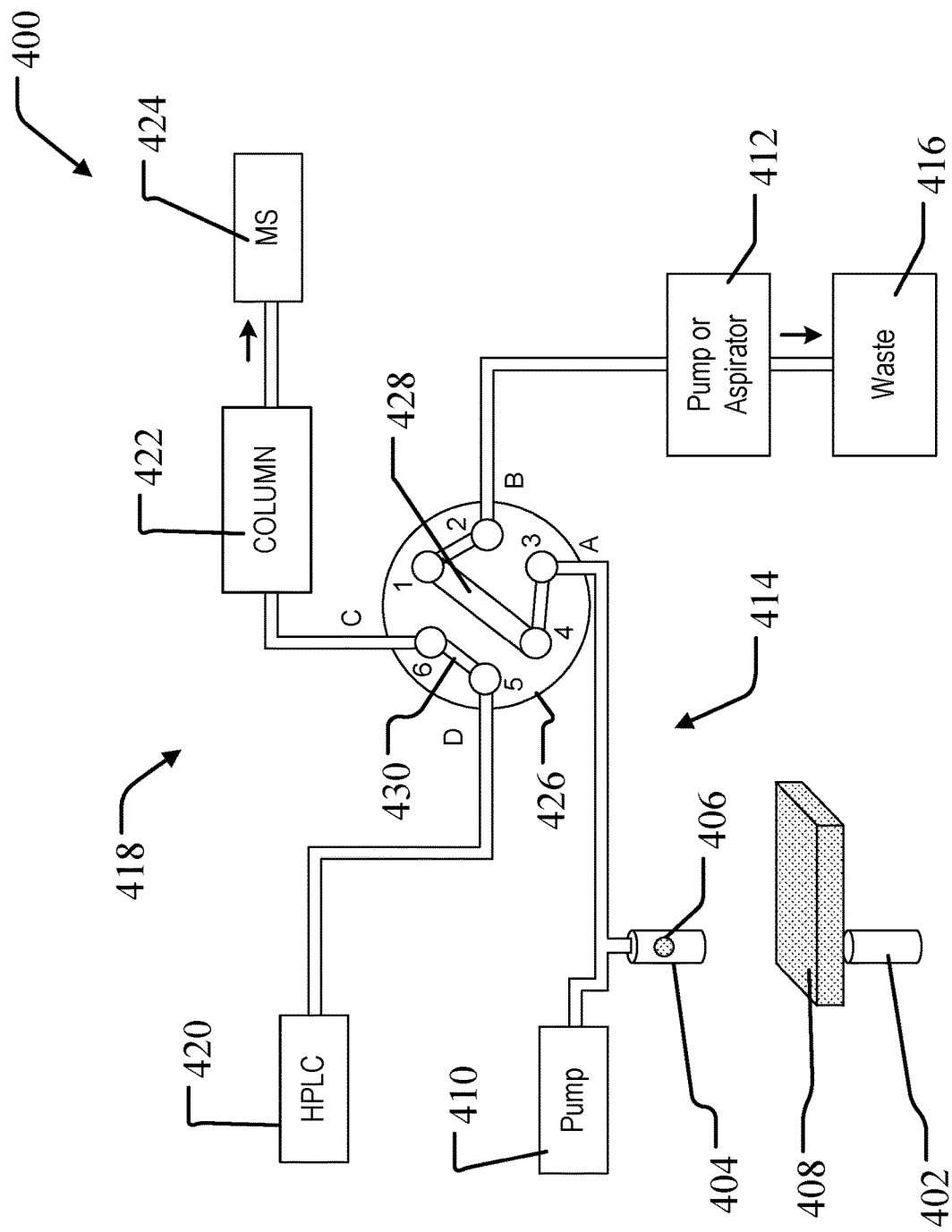
FIGS. 4A-4D depict schematic views of an HPLC system utilizing a non-contact sampling device and an OPI sampling interface, at various stages of operation.
Figure 4B:
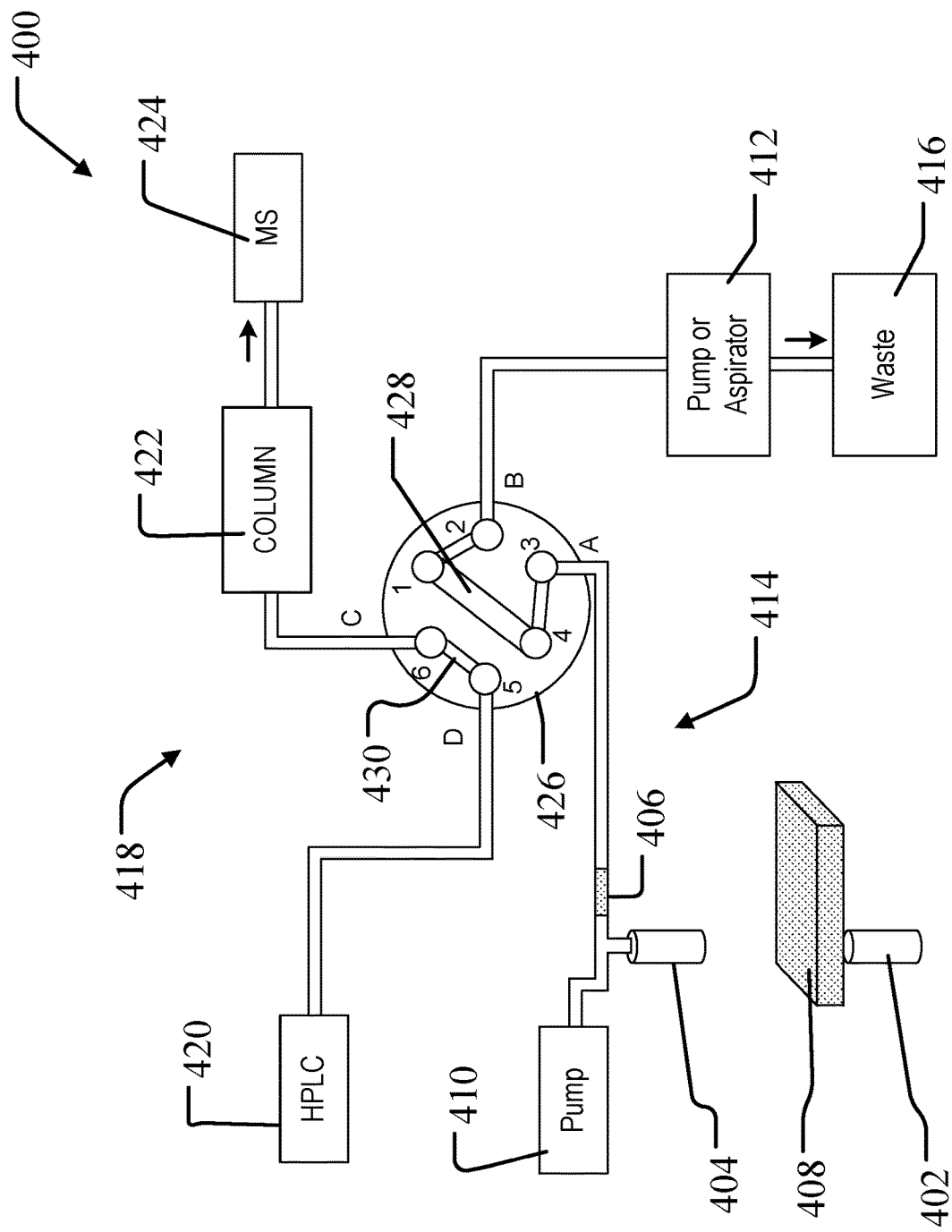
Figure 4C:
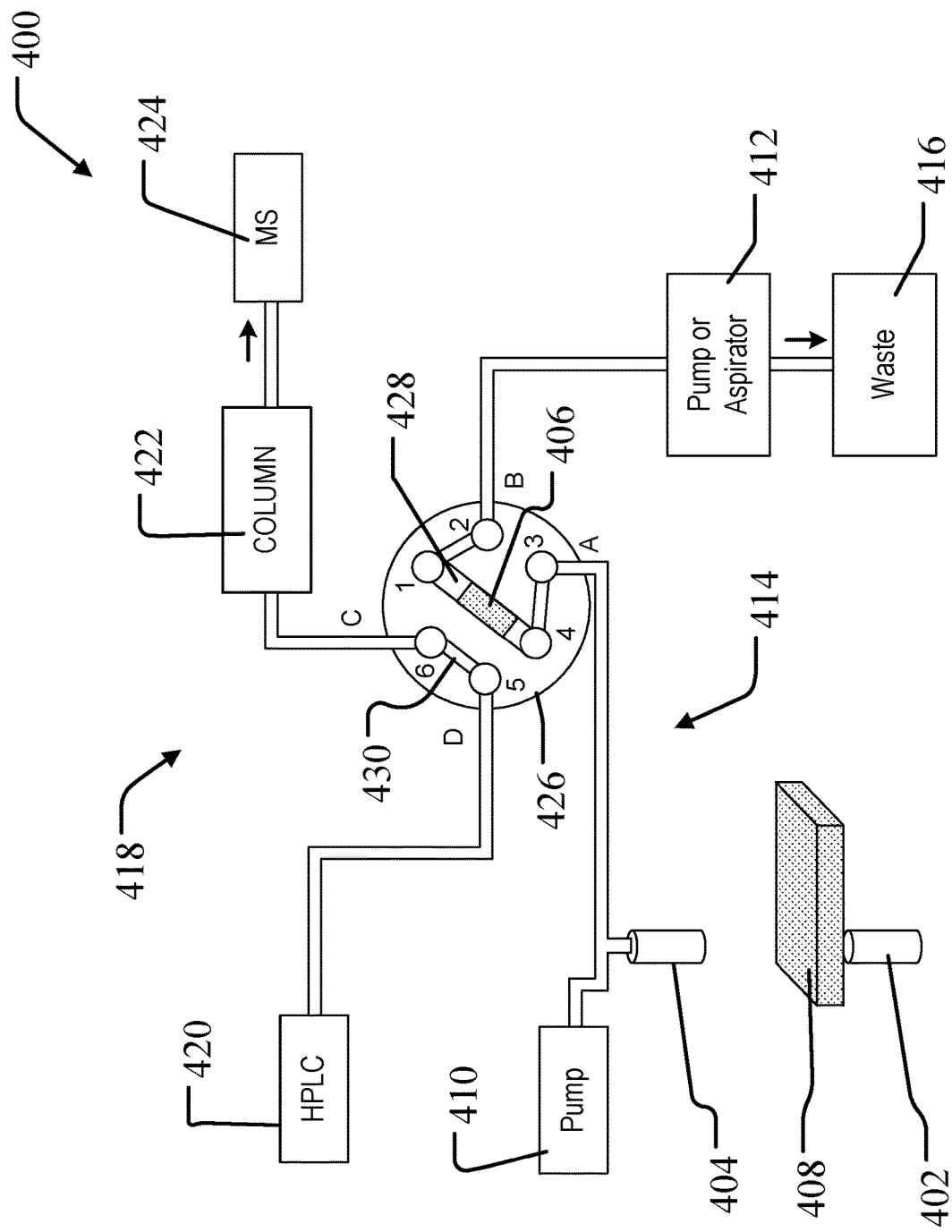
Figure 4D:
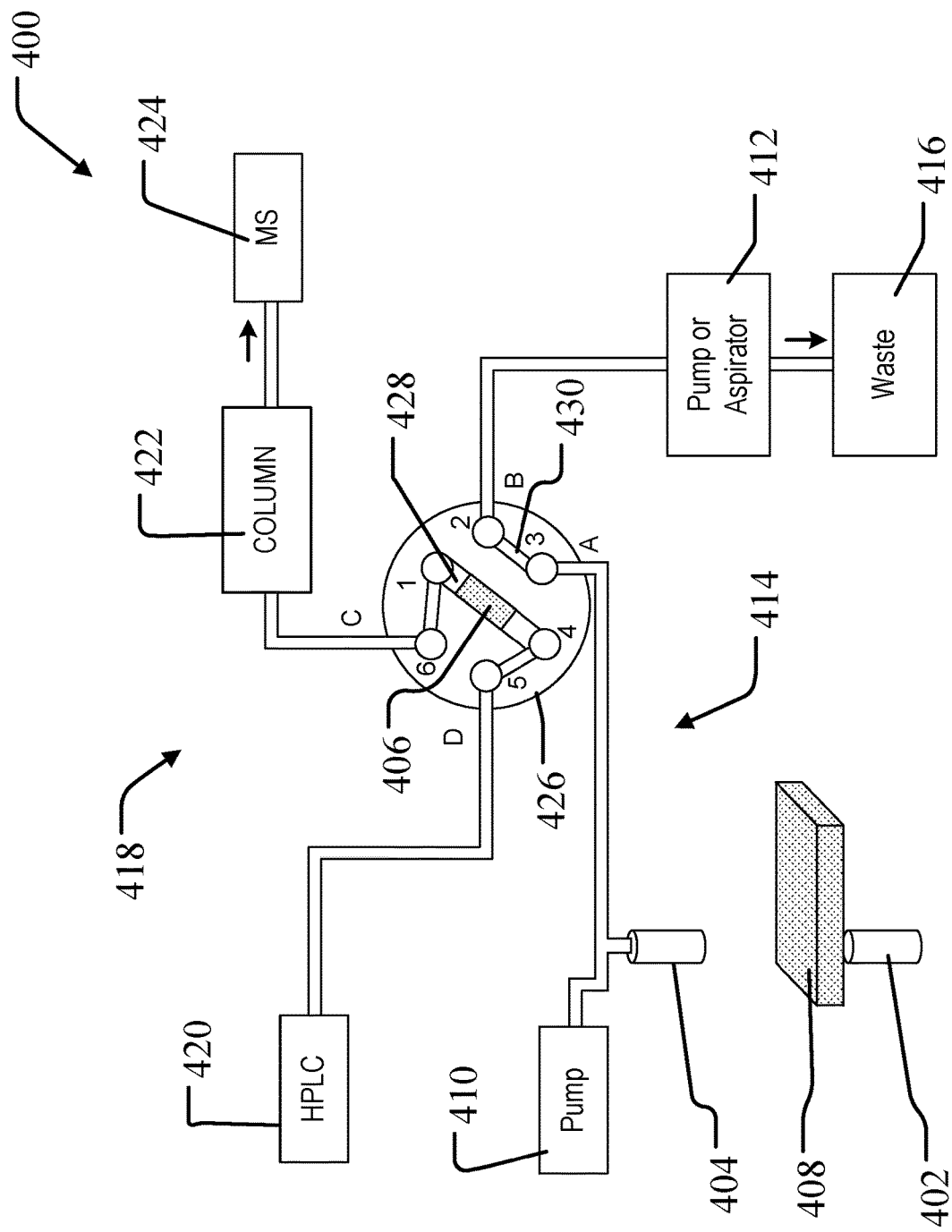

There are numerous ways to connect tubing and valves to accomplish this. One such example, beginning with FIG. 4A, the valve 426 is in a first position, where ports 1-2, 3-4, and 5-6 are fluidically coupled via a dedicated rotor channel. In this first position, tubing A and B are fluidically coupled as follows: tubing A to port 3 through the valve rotor channel, port 4 through the sample transfer chamber 428 to port 1, port 1 through the valve rotor channel to port 2, port 2 to tubing B of the sample receiving circuit 414. This leaves, ports 5 and 6 coupled to tubing C and D, respectively, of the LC analysis circuit 418. The rotor channel between ports 5 and 6 functions as a bypass channel 430. Transport liquid is delivered to the sample receiving circuit 414 by the transport liquid pump 410. The waste pump or aspirator 412 is operated simultaneously at a substantially similar or the same flow rate, thereby drawing a flow of transport liquid through the sample receiving circuit 414, as well as preventing overflow at the OPI 404. A sample is introduced to the OPI 404 in the form of a droplet 406 ejected with the non-contact ejector 402. The various functions of the sample receiving circuit 414 may be performed substantially simultaneously with those of the LC analysis circuit 418, but this is not required. In the LC analysis circuit 418, solvent may be pushed through the LC column 422 towards the detector 424, but this is not required. In fact, it may be desirable to maintain only a minimal flow through the LC analysis circuit 418, to prevent undesirable waste of the solvent. In FIG. 4B, the liquid sample droplet 406 is transported, via the aspirated transport liquid, towards the valve 426, until it is ultimately received in the sample transfer chamber 428, as depicted in FIG. 4C. Since the flow rate of the waste pump 412 is known, along with the tubing volume, the time required for the droplet 406 to travel from the OPI 404 to the sample transfer chamber 428 is known and may be timed appropriately. At this time, flow of transport liquid into the OPI 404 is terminated, as is aspiration of the transport liquid and sample 406 through the sample receiving circuit 414 (e.g., operation of the transport liquid pump 410 and the waste pump 412 ceases). Thereafter, as depicted in FIG. 4D, the valve 426 is positioned in a second position, where ports 1-6, 2-3, and 4-5 are fluidically coupled. In this second position, tubing A and B are fluidically coupled directly through the bypass channel 430. Tubing C and D are fluidically coupled as follows: tubing C to port 6 through the rotor channel, port 6 to port 1 through the rotor channel, port 1 through the sample transfer chamber 428 to port 4, port 4 through the rotor channel to port 5, and port 5 to tubing D of the LC analysis circuit 414. This fluidically couples the sample transfer chamber 428 to the LC analysis circuit 418, where the HPLC pump 420 may then push the sample 406 through the LC column 422. An eluent of the separated sample and the solvent exits the LC column 422 and is pushed on to the detector 424. Since ports 2 and 3 are presently fluidically coupled to connections A and B of the sample receiving circuit 414, respectively, the solvent contained within bypass channel 430 of the valve 426 may be flushed from the system 400 by operation of the waste pump 412.

Figure 5:
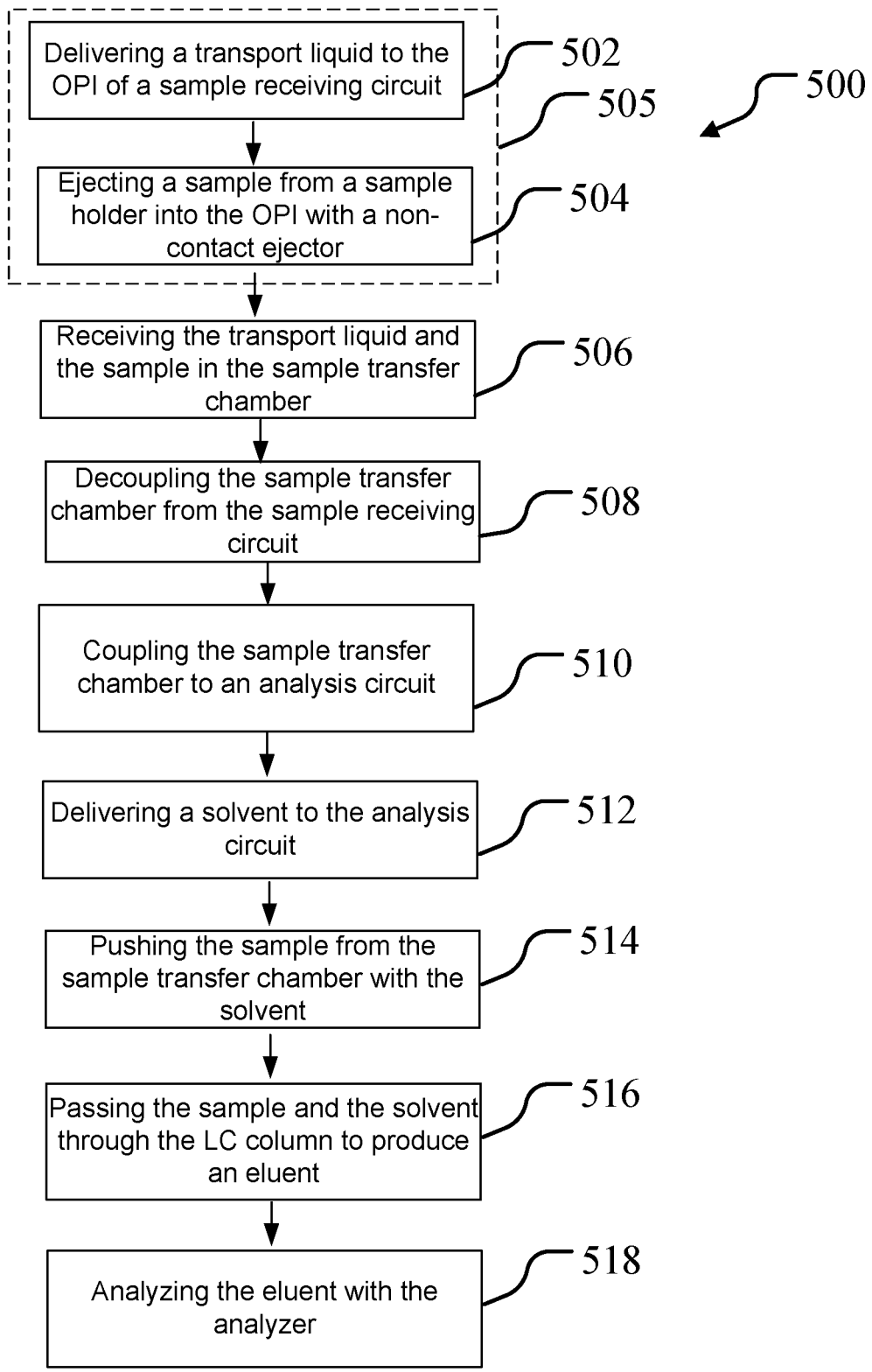
FIG. 5 depicts a method of operating an HPLC system that incorporates an OPI and a non-contact ejector.

Another method 500 of operating an LC system utilizing an OPI and a non-contact ejector is depicted in FIG. 5. This method 500 may be performed with the HPLC system depicted, for example, in FIGS. 4A-4D, above. The method 500 begins with operation 502, delivering a transport liquid to the OPI of a sample receiving circuit. The sample receiving circuit includes a sample transfer chamber of a valve in fluidic communication therewith. Examples of such valves containing a sample transfer chamber are depicted in FIGS. 4A-4D above, and elsewhere herein. As the transport liquid is delivered by the transport liquid pump, the sample receiving circuit, including the sample transfer chamber, fills with the transport fluid. In order to maintain desirable flow conditions within the OPI, a portion of the transport liquid introduced to the sample transfer chamber is aspirated therefrom, for example, by operation of the waste pump. In examples, the waste pump may operate at a volumetric flow rate substantially similar to that of the transport liquid pump. In other examples, however, the volumetric flow rate of the waste pump may be slightly greater than that of the transport liquid pump to ensure, so as to more clearly prevent an overflow condition, which may occur when a larger sample volume is introduced to the OPI. Regardless, appropriate volumetric flow rates to and from an OPI to prevent overflow thereof are known.

Operation 504 includes ejecting a sample droplet from a sample holder into the OPI with a non-contact ejector. In examples, operations 502 and 504 may be performed substantially simultaneously, as depicted by dashed box 505. Operation 506 includes receiving the transport liquid and the sample in the sample transfer chamber. Once in the sample transfer chamber, the sample is ready to be introduced to the LC analysis circuit. Prior to performing the introduction, however, operation of the transport liquid pump and the waste pump is terminated, thereby ceasing flow of transport liquid through the sample receiving circuit. With transport liquid flow terminated, ejections of samples also cease. In operation 508, the sample transfer chamber is decoupled from the sample receiving circuit. Thereafter, the sample transfer chamber is coupled to an analysis circuit of the LC system, operation 510. In the context of the system depicted in FIGS. 4A-4D, operations 508 and 510 contemplate rotating, adjusting, or otherwise actuating a valve to change the circuit to which the sample transfer chamber is coupled. In other examples, one or more gate valves may be opened or closed (or multi-position valves may be actuated) so as to connect the sample transfer chamber to the desired circuit. With the sample receiving chamber now fluidically coupled to the LC analysis circuit, operation 512, delivering a solvent to the LC analysis circuit, is performed, e.g., with an HPLC pump. This delivery of solvent pushes the sample from the sample transfer chamber, operation 514. Continued pressure applied by the HPLC pump passes the sample and the solvent through the LC column to produce an eluent, operation 516. This eluent is then forced downstream to be analyzed with an analyzer in operation 518. During or after this analysis is performed in the LC analysis circuit, transport liquid flow may recommence in the sample receiving circuit, which is once again complete due to the position of the bypass, as depicted in FIG. 4D. This transport liquid flow may flush any solvent present in the bypass to a waste station. Also, any samples that may be present in the sample receiving circuit may also be flushed. This may be desirable under circumstances where, after analysis of a number of samples are performed successfully, any remaining untested samples may be flushed from the system without testing. Upon completion of any desired analyzing or flushing operations, the sample transfer chamber may be recoupled to the sample receiving circuit for introduction of additional sample(s) for testing.

Figure 6A:
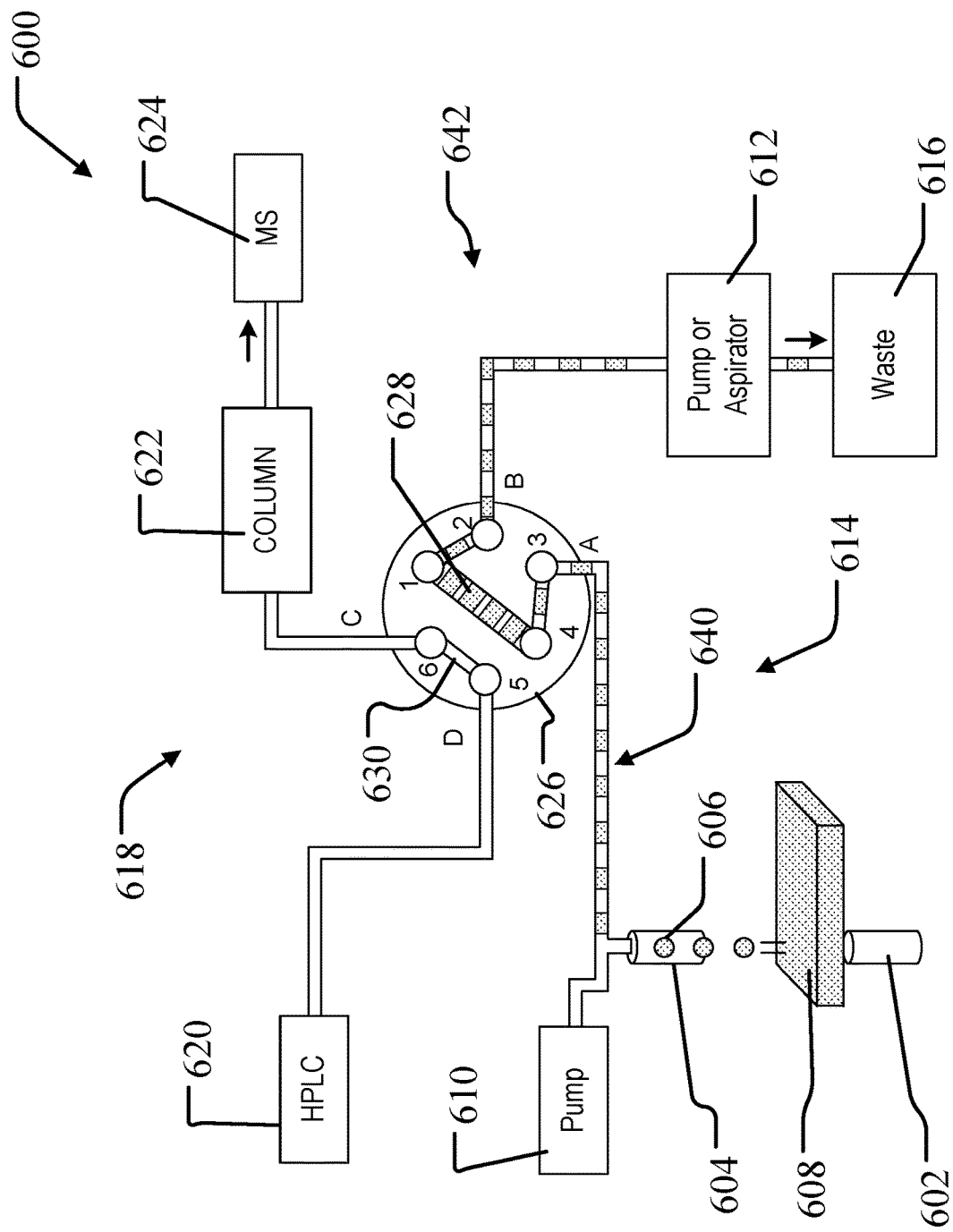
FIGS. 6A-6B depicts the HPLC system of FIGS. 4A-4D at various stages of operation processing multiple samples.
Figure 6B:
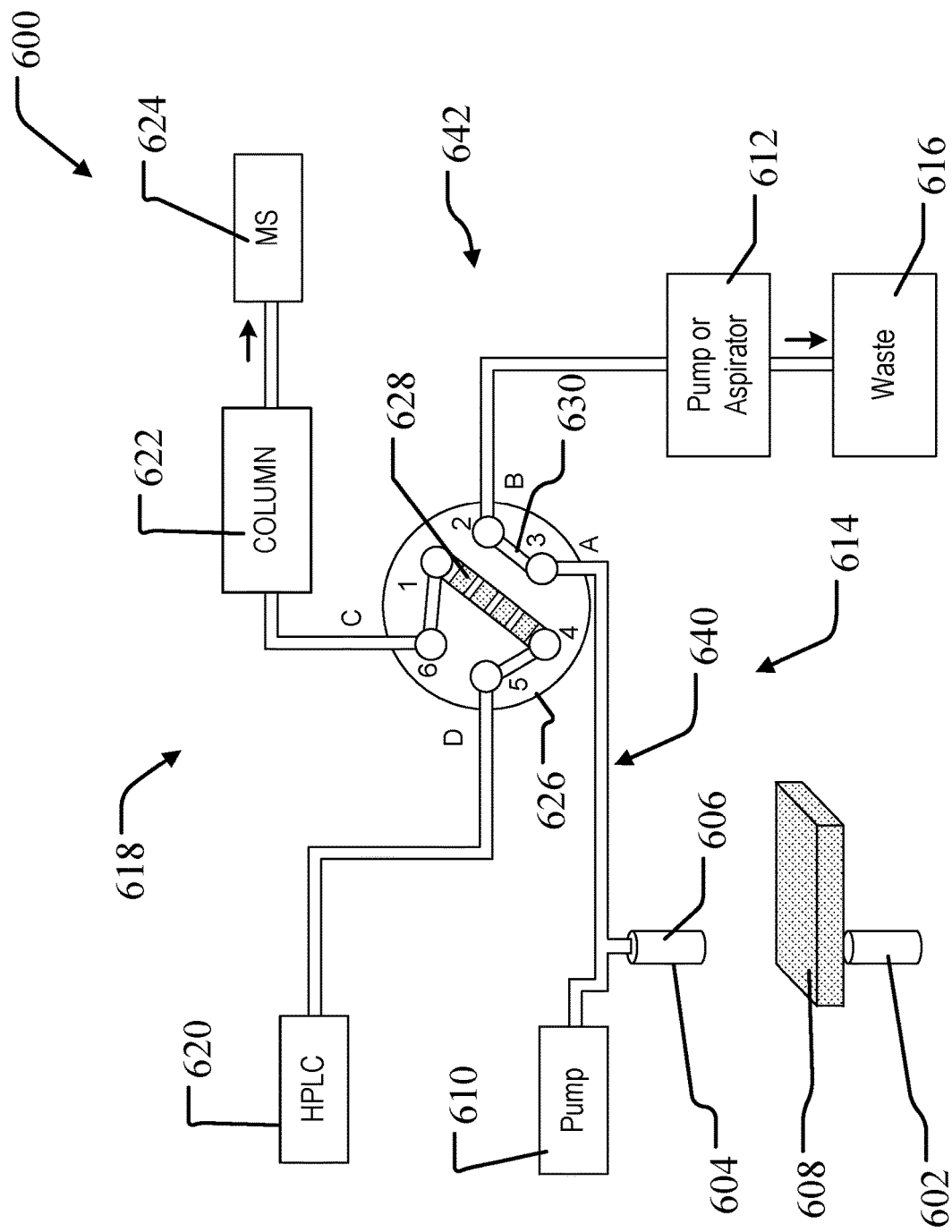

FIGS. 6A-6B depicts a HPLC system 600 for processing multiple ejected sample droplets 606. In general, elements or components beginning with the number 600 in FIGS. 6A and 6B correspond to elements or components beginning with the number 400 in FIGS. 4A-4D. As such, not every element or component is necessarily described again with regard to FIGS. 6A and 6B. The system 600 depicts a plurality of sample droplets 606 ejected from a well plate 608 with a non-contact ejector 602. The samples 606 may be multiple ejections from a single well or may be a single ejection from each well of the well plate 608. The ejected samples 606 stack along the inlet side 640 of the sample receiving circuit 614 towards the valve 626. In FIG. 6A, the valve 626 is depicted in the first position, as described above with regard to FIG. 4A. In this first position, flow of the samples 606 and the transport fluid passes into the sample transfer chamber 628, where, again, the sample droplets 606 remain stacked for transfer to the analysis circuit 618. On the outlet side 642 of the sample receiving circuit 614, untested samples 606 may be aspirated by waste pump 612 towards a waste container 616. During this time, solvent flow from the HPLC pump 620 may pass through the bypass 630, since it is generally desirable to maintain some solvent flow through the LC column 622. Flow of transport fluid into and out of the OPI 604 may cease by terminating operation of the transport liquid pump 610 and the waste pump 612, and flow of solvent may cease by terminating operation of the HPLC pump 620. Thereafter, the valve 626 may be moved to the second position, as depicted in FIG. 6B, and as described above in the context of FIG. 4D. Solvent delivered by the HPLC pump 620 forces the samples 606 through the column 622, from which an eluent flows to the analyzer 624. Prior to the valve 626 returning to the first position, transport liquid flow generated by the transport liquid pump 610 and waste pump 612 may be used to flush the sample receiving circuit 614. This is due to the position of the bypass 630 relative to connections A and B of the sample receiving circuit 614. The transport liquid may be used as the flushing liquid or another liquid may be introduced via a supplemental port downstream of the OPI 604. Flushing operations may be performed substantially simultaneously with the passing of samples 606 through the column 622 and/or introduction to the analyzer 624.

The system configuration depicted in FIGS. 4A-4D and 6A-6B may be further modified, as required or desired, for particular applications. FIGS. 7-10 depict a number of different systems. In each, elements or components beginning with the numbers 700 to 1000 in FIGS. 7-10 correspond to elements or components beginning with the number 400 in FIGS. 4A-4D. As such, not every element or component is necessarily described again with regard to FIGS. 7-10. Distinguishing elements or components, functions, operations, etc., are described. Methods of using such systems are also described and would be apparent to a person of skill in the art.

Figure 7:
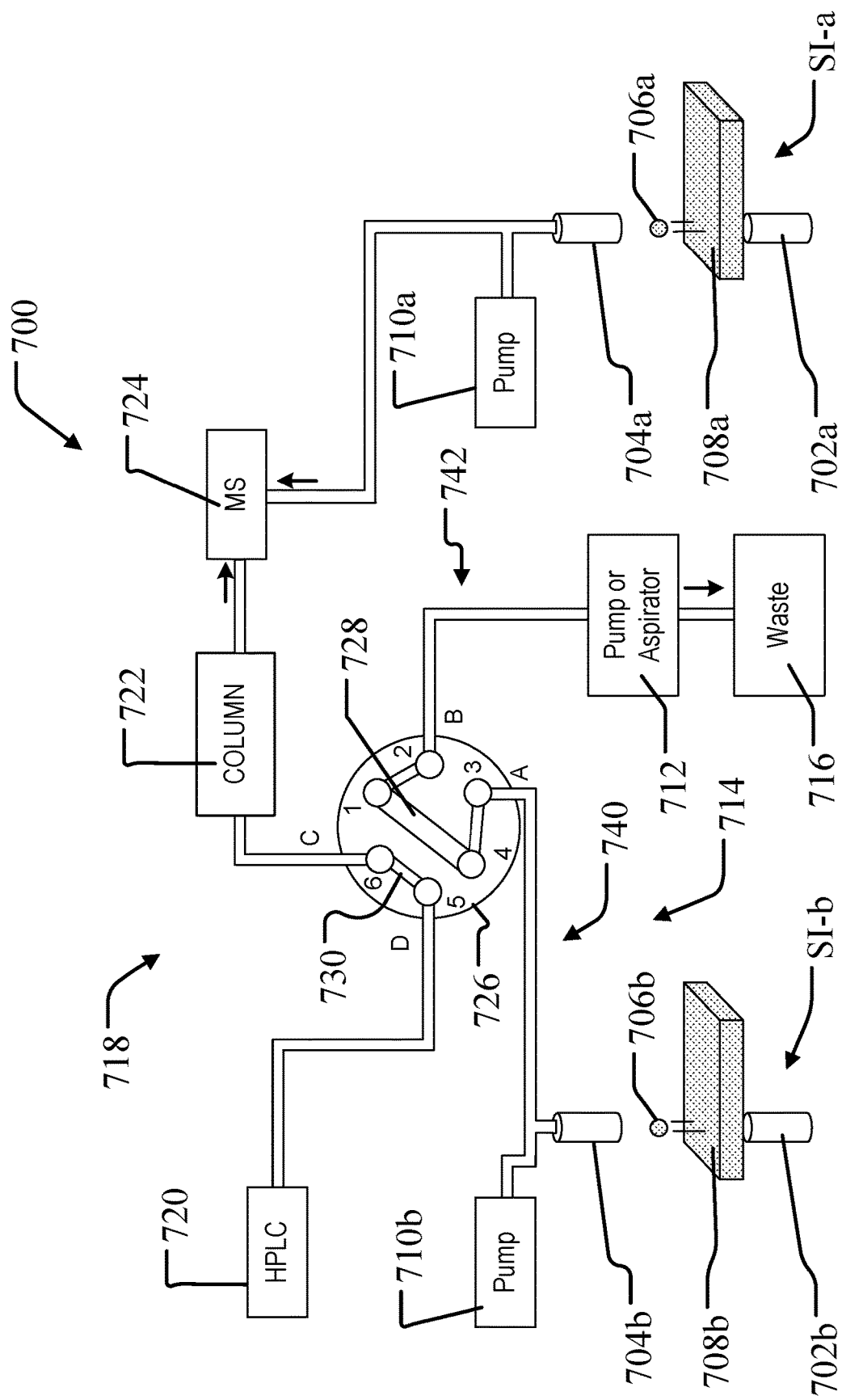
FIGS. 7-10 depict other examples of HPLC systems.

In FIG. 7, the depicted system 700 includes two sample introduction stations, identified as SI-a and SI-b. Each station includes an OPI 704, a transport liquid pump 710, and a non-contact ejector 702. Two well plates 708 and ejected droplets 706 are also depicted. In operation, sample introduction station SI-b introduces samples 706b as described above in the context of FIGS. 4A-4D and 6A-6B. Sample introduction station SI-a, however, is directly connected (meaning, without an intervening valve 626 and LC analysis circuit 718), to the analyzer 724. Thus, samples 706a introduced at sample introduction station SI-a may be analyzed consistent with known analysis systems, without an intervening LC analysis process. In that case, aspiration force driving the fluid transfer from the OPI 704a is from the nebulizer gas being discharged from an ESI electrode such as depicted in the system depicted in FIG. 3. In examples, well plates 708a and 708b may be the same well plate. First, sample droplets 706a from the well plate 708 may be ejected from sample introduction station SI-a for analysis by the analyzer 724. If required or desired based on the results obtained, the well plate 708 may be moved to sample introduction station SI-b, where the sample droplets 706b may be ejected and analyzed as described elsewhere herein. This may be particularly useful for samples that include large-scale compounds, which may first be introduced in sample introduction station SI-a and directly analyzed by the analyzer 724. Compound samples that require an additional analysis that would benefit from LC separation may then be introduced via sample introduction station SI-b and processed as described above. Thus, in a well tray having a significant number of sample wells, not every sample in every sample well need be subjected to the lengthy process time required for LC analysis, allowing for additional time savings.

Figure 8:
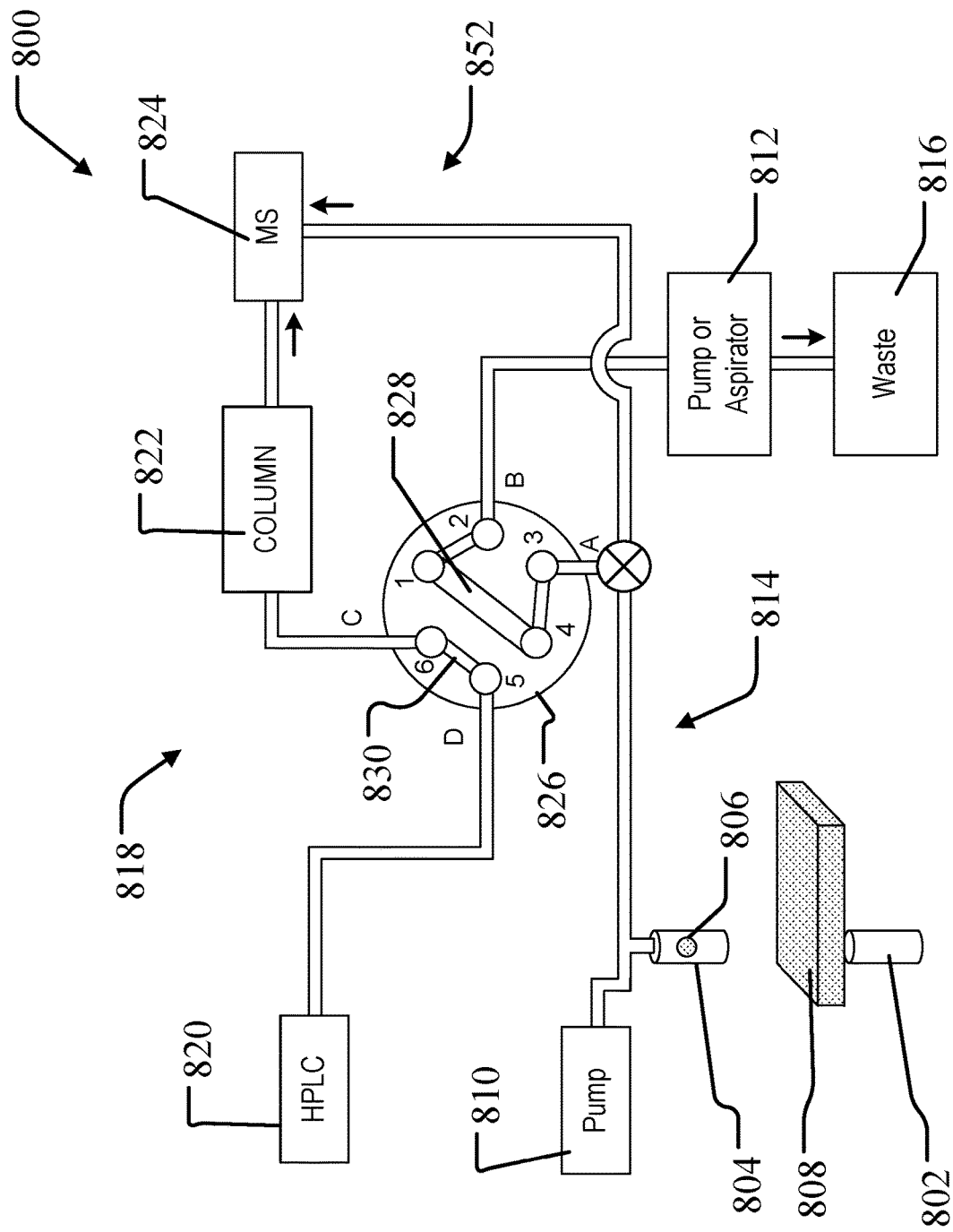

FIG. 8 is similar to the system 700 depicted in FIG. 7, but without a sample introduction station directly connected to the analyzer 824. Instead, a single sample introduction station, with a dedicated OPI 804, non-contact ejector 802, and transport liquid pump 810 is utilized. The system includes a circuit selection valve 850 that selectively connects the sample receiving circuit 814 to either the valve 826 for connection to the LC analysis circuit 818 or a direct analysis circuit 852. The direct analysis circuit 852 is connected to the analyzer 824, where the electrospray electrode (element 316, FIG. 3) aspirates the transport liquid and sample droplets 806 for analysis. As described above with regard to FIG. 7, this may be useful for first screening large scale compounds, then passing select compounds for further LC-based separation. Thereafter, the circuit selection valve 850 may disconnect or decouple the sample receiving circuit 814 from the analyzer 824 and the waste pump 812 may be activated to aspirate the sample droplets 806 and transport liquid into the valve 826. LC analysis thereof may then be performed as described above in FIGS. 4A-4D and 6A-6B.

Figure 9:
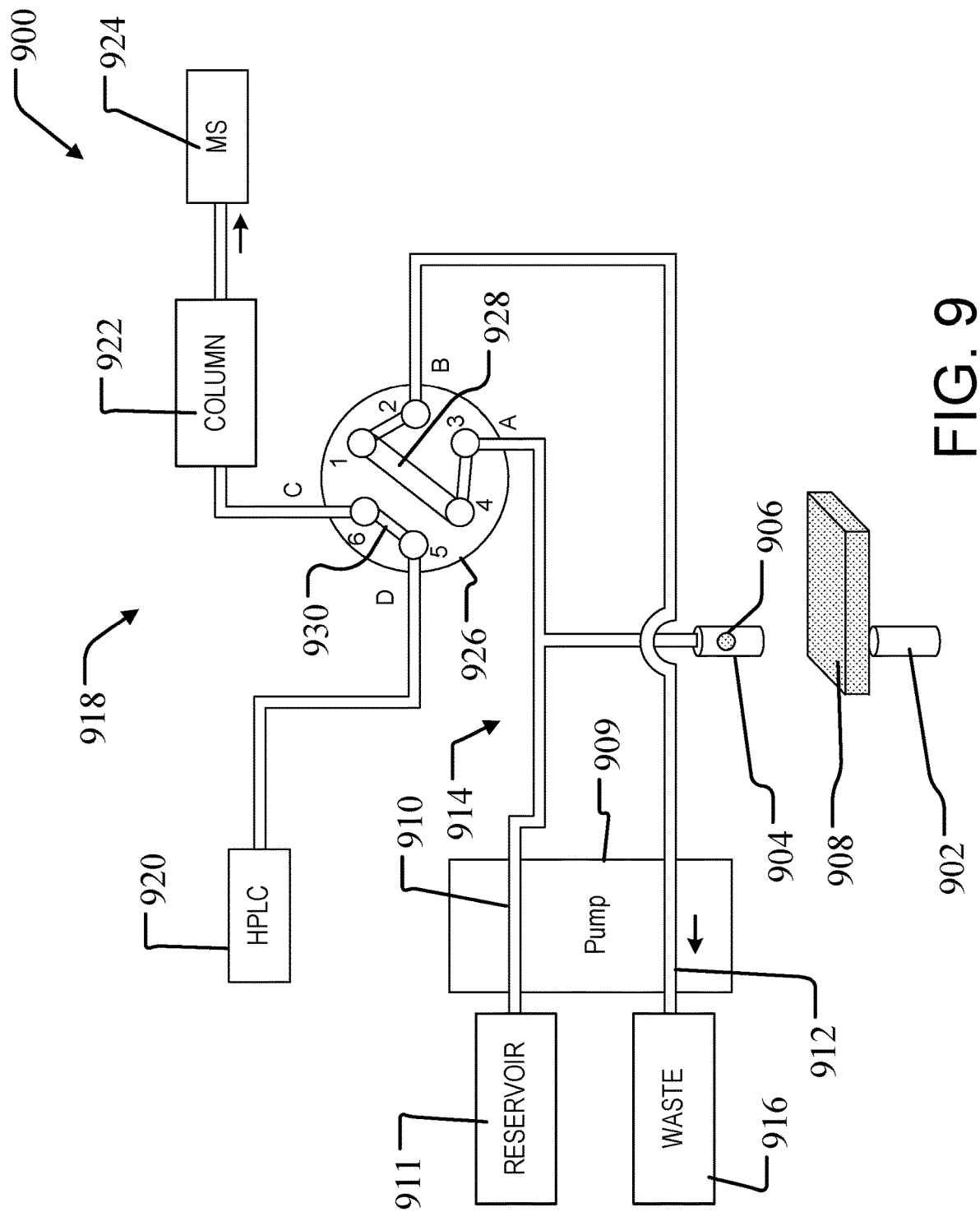

FIG. 9 depicts a system 900 that utilizes a single pump 409 (e.g., a peristaltic pump) that both delivers transport liquid (via delivery circuit 910) to the OPI 904 via the sample receiving circuit 914, as well as aspirates the transport liquid and sample droplet 906 through the valve 926 and towards the waste container 916, via a waste circuit 912. Instead of an integral transport liquid pump and reservoir as depicted elsewhere herein, a discrete transport liquid reservoir 911 is utilized as a source of the transport liquid. Since the peristaltic pump 909 produces a balanced flow in both the delivery circuit 910 and the waste circuit 912, control to ensure balanced flow at the OPI 904 is simplified.

Figure 10:
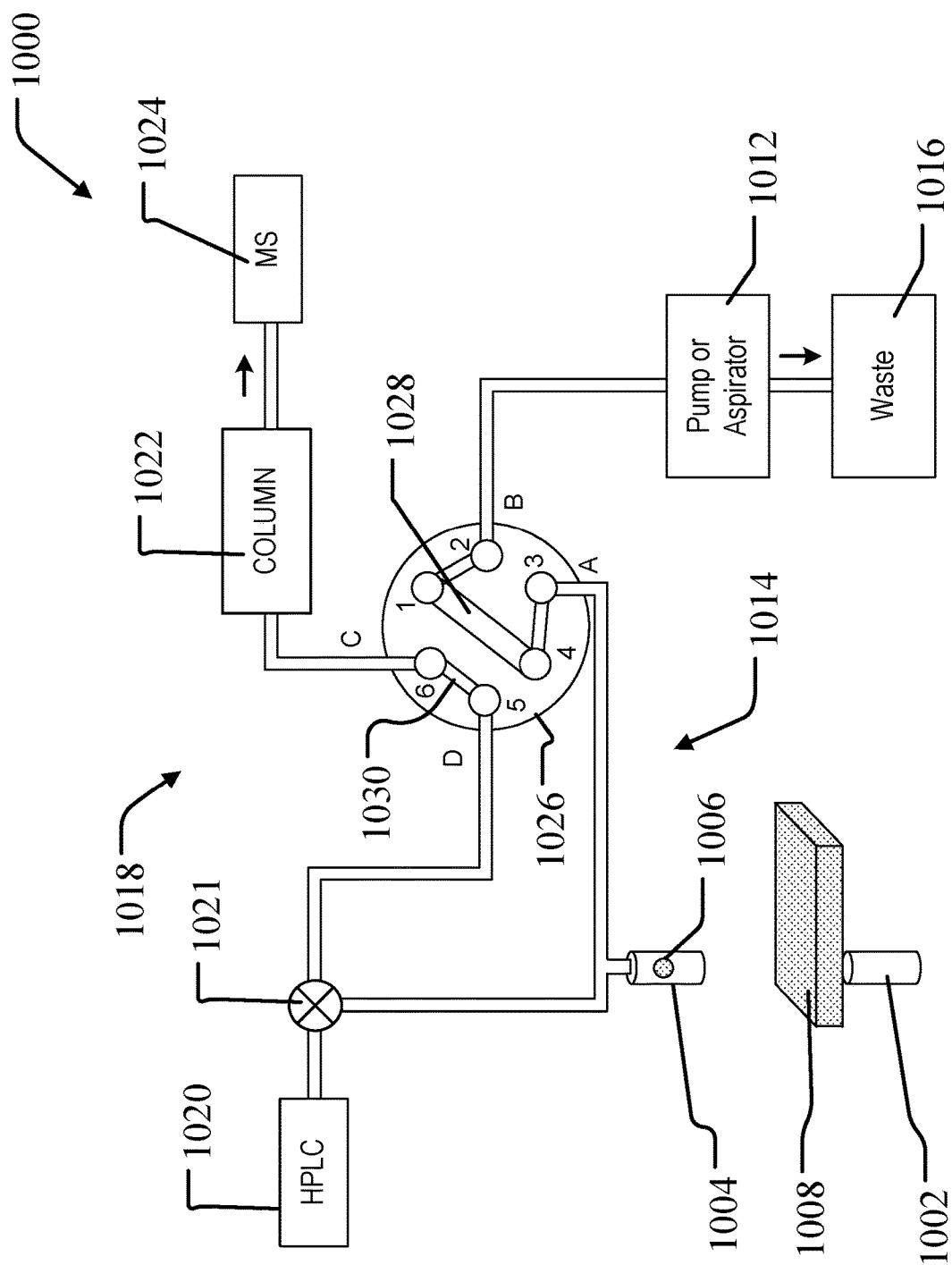

FIG. 10 depicts another system 1000 that, in this example, utilizes a HPLC pump 1020 to deliver solvent to both the LC analysis circuit 1018 and the sample receiving circuit 1014. A valve 1021 controls the flow therefrom and may be configured to divert only a minimal amount of solvent from the LC analysis circuit 1018, so as to not starve the LC column 1022. In this example, the solvent acts as the transport liquid prior to introduction of the solvent and sample droplets 1006 to the LC analysis circuit 1018.

Figure 11:
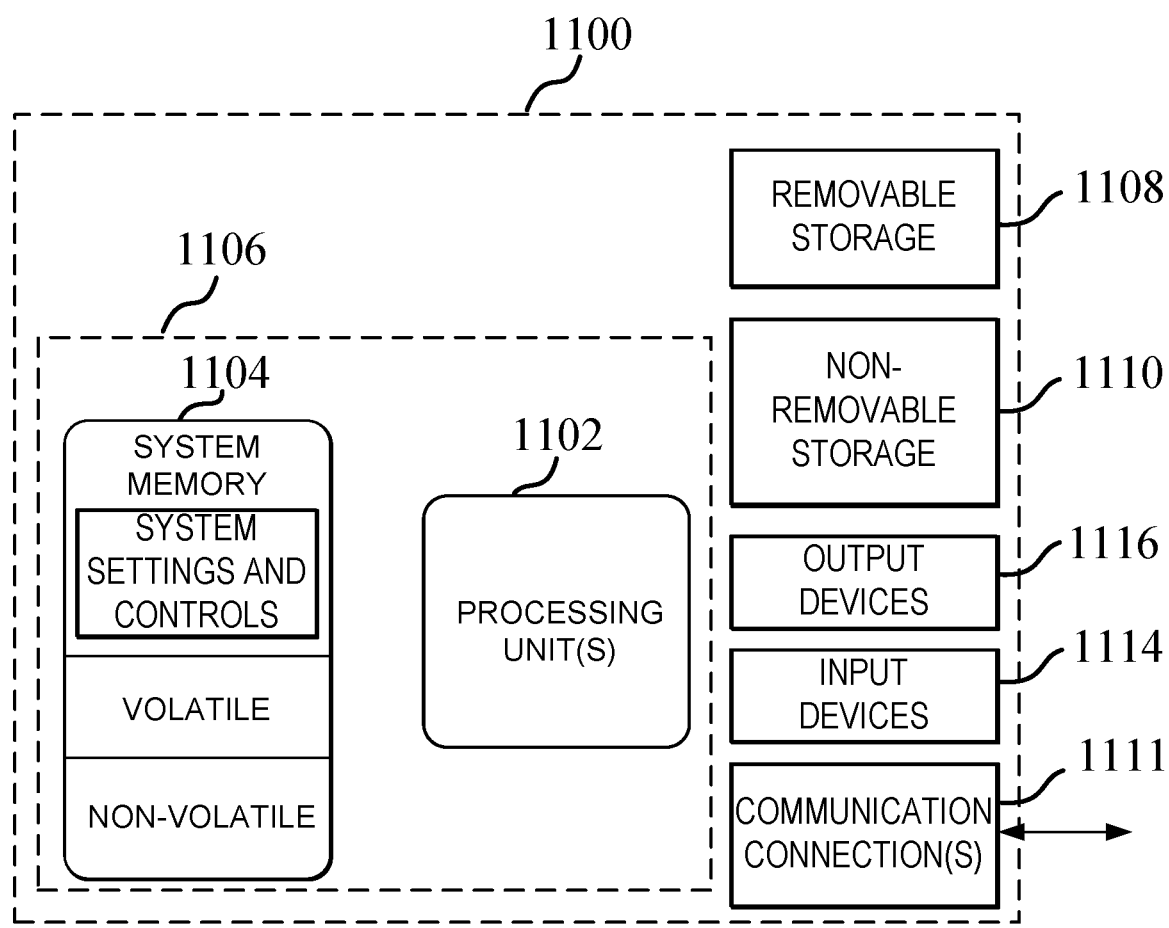
FIG. 11 depicts an example of a suitable operating environment in which one or more of the present examples can be implemented.

FIG. 11 depicts one example of a suitable operating environment 1100 in which one or more of the present examples can be implemented. This operating environment may be incorporated directly into the controller for a system, e.g., such as the controllers depicted in FIGS. 1-3 that control operation of the various components of the analysis system. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 1100 typically includes at least one processing unit 1102 and memory 1104. Depending on the exact configuration and type of computing device, memory 1104 (storing, among other things, instructions to control the non-contact ejection device, position of the valve(s), activation of the various pumps, etc., or perform other methods disclosed herein) can be volatile (such as RAM), non-volatile (such as ROM, flash memory, etc.), or some combination of the two. This most basic configuration is illustrated in FIG. 11 by dashed line 1106. Further, environment 1100 can also include storage devices (removable, 1108, and/or non-removable, 1110) including, but not limited to, magnetic or optical disks or tape. Similarly, environment 1100 can also have input device (s) 1114 such as touch screens, keyboard, mouse, pen, voice input, etc., and/or output device(s) 1116 such as a display, speakers, printer, etc. Also included in the environment can be one or more communication connections 1112, such as LAN, WAN, point to point, Bluetooth, RF, etc.

Operating environment 1100 typically includes at least some form of computer readable media. Computer readable media can be any available media that can be accessed by processing unit 1102 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 1100 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 1100 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 1100 is part of a network that stores data in remote storage media for use by the computer system 1100.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of performing liquid chromatography (LC) with an LC system comprising an LC column and an analyzer, the method comprising:
    delivering a transport liquid to an open port interface (OPI) of a sample receiving circuit, wherein the sample receiving circuit comprises a sample transfer chamber;
    ejecting a sample from a sample holder into the OPI with a non-contact ejector;
    receiving the transport liquid and the sample in the sample transfer chamber;
    decoupling the sample transfer chamber from the sample receiving circuit;
    coupling the sample transfer chamber to an analysis circuit;
    delivering a solvent to the analysis circuit;
    pushing the sample from the sample transfer chamber with the solvent;
    passing the sample and the solvent through the LC column to produce an eluent; and
    analyzing the eluent with the analyzer.

2. The method of claim 1, wherein the sample is ejected into the OPI substantially simultaneously with delivering the transport liquid to the OPI.

3. The method of claim 1, further comprising aspirating a portion of the transport liquid from the sample transfer chamber substantially simultaneously with delivering the transport liquid to the OPI.

4. The method of claim 3, further comprising ejecting from a waste outlet the portion of the transport liquid aspirated from the sample transfer chamber.

5. The method of claim 3, wherein delivering the transport liquid to the OPI comprises pumping the transport liquid to the OPI at a first flow rate with a first pump.

6. The method of claim 5, wherein aspirating the portion of the transport liquid from the sample transfer chamber comprises aspirating the portion of the transport liquid at a second flow rate with a second pump.

7. The method of claim 6, wherein the first flow rate and the second flow rate are substantially similar.

8. The method of claim 1, further comprising, prior to decoupling the sample transfer chamber from the sample receiving circuit, terminating delivery of the transport liquid to the OPI and terminating ejection of the sample from the sample holder.

9. The method of claim 8, further comprising, prior to decoupling the sample transfer chamber from the sample receiving circuit, receiving a plurality of samples in the sample transfer chamber.

10. The method of claim 1, further comprising during pushing of the sample, flushing the sample receiving circuit with a flushing liquid.

11. The method of claim 10, wherein the transport liquid is substantially similar to the flushing liquid.

12. The method of claim 10, wherein flushing the sample receiving circuit comprises operating a transport liquid pump and a waste pump.

13. The method of claim 1, further comprising, subsequent to pushing of the sample, recoupling the sample transfer chamber to the sample receiving circuit.

14. The method of claim 1, wherein the transport liquid and the solvent are different.

15. A liquid chromatography (LC) system comprising:
    an analysis circuit comprising a solvent pump and an LC column;
    an analyzer fluidically coupled to the LC column;
    a sample receiving circuit comprising a transport liquid pump and an open port interface (OPI) fluidically coupled to the transport liquid pump;
    a non-contact ejector configured to eject droplets from a sample holder into the OPI; and
    a sample transfer chamber selectively positionable in a first position and a second position, wherein in the first position, the sample transfer chamber is fluidically coupled to the sample receiving circuit, and wherein in the second position, the sample transfer chamber is fluidically coupled to the analysis circuit.

16. The LC system of claim 15, wherein the sample receiving circuit further comprises a waste pump selectively fluidically couplable to the sample transfer chamber.

17. The LC system of claim 16, wherein the transport liquid pump is the waste pump.

18. The LC system of claim 15, wherein the sample transfer chamber is disposed within a six-port valve.

19. The LC system of claim 15, wherein the analyzer comprises a mass spectrometry device.

20. The LC system of claim 15, wherein the non-contact ejector comprises an acoustic droplet ejector.

\* \* \* \* \*